(12) United States Patent
Sujaku et al.

(10) Patent No.: US 9,132,647 B2
(45) Date of Patent: Sep. 15, 2015

(54) LIQUID EJECTION HEAD AND FABRICATING METHOD THEREFOR

(71) Applicant: CANON KABUSHIKI KAISHA, Tokyo (JP)

(72) Inventors: Shiro Sujaku, Kawasaki (JP); Jun Yamamuro, Yokohama (JP); Hiroyuki Murayama, Yokohama (JP); Toshiaki Kurosu, Oita (JP); Yoshinori Tagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/494,989

(22) Filed: Sep. 24, 2014

(65) Prior Publication Data

US 2015/0097899 A1   Apr. 9, 2015

(30) Foreign Application Priority Data

Oct. 9, 2013   (JP) ................................. 2013-211884

(51) Int. Cl.
  *B41J 2/14*   (2006.01)
  *B41J 2/175*  (2006.01)
  *B29C 33/42*  (2006.01)
  *B29L 31/00*  (2006.01)

(52) U.S. Cl.
  CPC ................. *B41J 2/175* (2013.01); *B29C 33/42* (2013.01); *B29L 2031/757* (2013.01)

(58) Field of Classification Search
  CPC .......... B41J 2/1623; B41J 2/16; B41J 2/1637; B41J 2202/03
  USPC .................... 347/30, 45, 47, 85, 92; 29/890.1
  See application file for complete search history.

(56) References Cited

U.S. PATENT DOCUMENTS

| 7,128,390 | B2 | 10/2006 | Taniguchi | |
| 7,270,389 | B2 * | 9/2007 | Inoue et al. | 347/11 |
| 7,735,957 | B2 * | 6/2010 | Kudo et al. | 347/30 |
| 7,980,677 | B2 * | 7/2011 | Chino et al. | 347/65 |

FOREIGN PATENT DOCUMENTS

JP   2005-059554 A   3/2005

* cited by examiner

*Primary Examiner* — An Do
(74) *Attorney, Agent, or Firm* — Fitzpatrick, Cella, Harper & Scinto

(57) ABSTRACT

An object of the present invention is to provide a liquid ejection head capable of suppressing the capture of bubbles into the liquid ejection head including ejection ports having different opening areas so as to satisfactorily fill a liquid channel and the ejection ports with liquid. In order to achieve the object, the liquid ejection head according to the present invention includes a liquid supply port communicating with a plurality of kinds of ejection ports, and further, a defoaming opening communicating with another ejection port except an ejection port having a large opening area out of the plurality of kinds of ejection ports via a defoaming channel.

10 Claims, 7 Drawing Sheets

LIQUID EJECTION HEAD AND FABRICATING METHOD THEREFOR

BACKGROUND OF THE INVENTION

1. Field of the Invention

The present invention relates to a liquid ejection head for ejecting liquid droplets from an ejection port so as to perform printing on a print medium and, more particularly, to a liquid ejection head provided with a plurality of kinds of ejection ports having different opening areas, and a fabricating method therefor.

2. Description of the Related Art

In a printing apparatus in which liquid such as ink is ejected from a fine ejection port formed in a liquid ejection head so as to perform printing, the evaporation of liquid (e.g., ink) to be ejected from a nozzle may cause a viscosity increasing phenomenon of the liquid, an increase in concentration of a colorant contained in the liquid, adhesion of the liquid, and the like. Moreover, if the apparatus is left for a long period of time, bubbles may be generated inside of a liquid channel of the liquid ejection head. The generation of the bubbles prevents a normal ink supplying operation. Depending on the situation, the ink may not flow in the head, thereby hindering a printing operation.

In order to avoid the above-described inconvenience, a surface of the liquid ejection head having an ejection port formed thereat (i.e., an ejection port surface) is capped with a cap, and further, a pump reduces pressure inside of the cap, so that a suction recovery process for sucking liquid from the ejection port is performed. In the suction recovery process, ink that stays inside of the liquid channel and becomes unsuitable for printing or bubbles are forcibly sucked from the ejection port: in the meantime, the liquid channel is filled with fresh liquid from a liquid tank. In this manner, the suction recovery process is properly carried out, so that the ink staying in the liquid ejection head can be kept suitable for ejection.

However, in a liquid ejection head having ejection ports having different opening areas arranged at the same ejection port surface so as to achieve high printing precision and high-speed printing, ejection ports having different meniscus forces exist in mixture, thereby making it difficult to properly perform the suction recovery process. Specifically, when a suction negative pressure is increased in order to suck and recover a small ejection port, a flow rate of liquid from a large ejection port exceeds the liquid supply ability of a liquid tank, and consequently, bubbles are taken into the ink channel from an absorber of the liquid tank, resulting in insufficient ink supply. In order to cope with this inconvenience, Japanese Patent Laid-Open No. 2005-059554 discloses a suction recovery process, in which a large ejection port is first sucked under a low suction negative pressure to be thus filled with ink, before a high suction negative pressure is instantaneously applied, so that a small ejection port is filled with liquid.

SUMMARY OF THE INVENTION

According to the first aspect of the present invention, a liquid ejection head capable of ejecting liquid from a plurality of kinds of ejection ports having different opening areas includes: a liquid supply port communicating with the plurality of kinds of ejection ports; and a defoaming opening communicating, via a defoaming channel, with at least one kind of ejection port out of other ejection ports except the ejection port having the largest opening area out of the plurality of kinds of ejection ports.

According to the second aspect of the present invention, a fabricating method for a liquid ejection head capable of ejecting liquid from a plurality of kinds of ejection ports having different opening areas includes the steps of: forming a mold for forming a liquid channel for supplying liquid to the ejection port and a defoaming channel communicating with the ejection port on a substrate having an energy generating element for ejecting liquid from the ejection port and having a liquid supply port formed thereat; forming a member covering the mold; forming the defoaming opening together with the ejection port on the member; and removing the mold so as to form the liquid channel and the defoaming channel.

Further features of the present invention will become apparent from the following description of exemplary embodiments (with reference to the attached drawings).

DESCRIPTION OF THE EMBODIMENTS

Also in the suction recovery process disclosed in Japanese Patent Laid-Open No. 2005-059554, a high suction negative pressure is instantaneously applied, and therefore, the flow rate of liquid in a liquid channel of a large ejection port surpasses a liquid supply ability, so that bubbles may be taken into the liquid channel from a liquid absorber of a liquid tank. As a consequence, even in the suction recovery process disclosed in Japanese Patent Laid-Open No. 2005-059554, the problem of the liquid supply caused by the bubbles possibly still arises.

A description will be given below of a liquid ejection head in the present embodiments according to the present invention. A liquid ejection head in the present embodiments is provided with ejection ports having large and small opening areas, and further, has a configuration in which suction and recovery can be carried out without applying an excessive suction negative pressure to a large ejection port. Consequently, with the liquid ejection head in the present embodiments, it is possible to suppress the capture of bubbles from a liquid absorber disposed at a liquid tank into an ink channel, thus achieving a high reliability.

(First Embodiment)

Figure 1A:
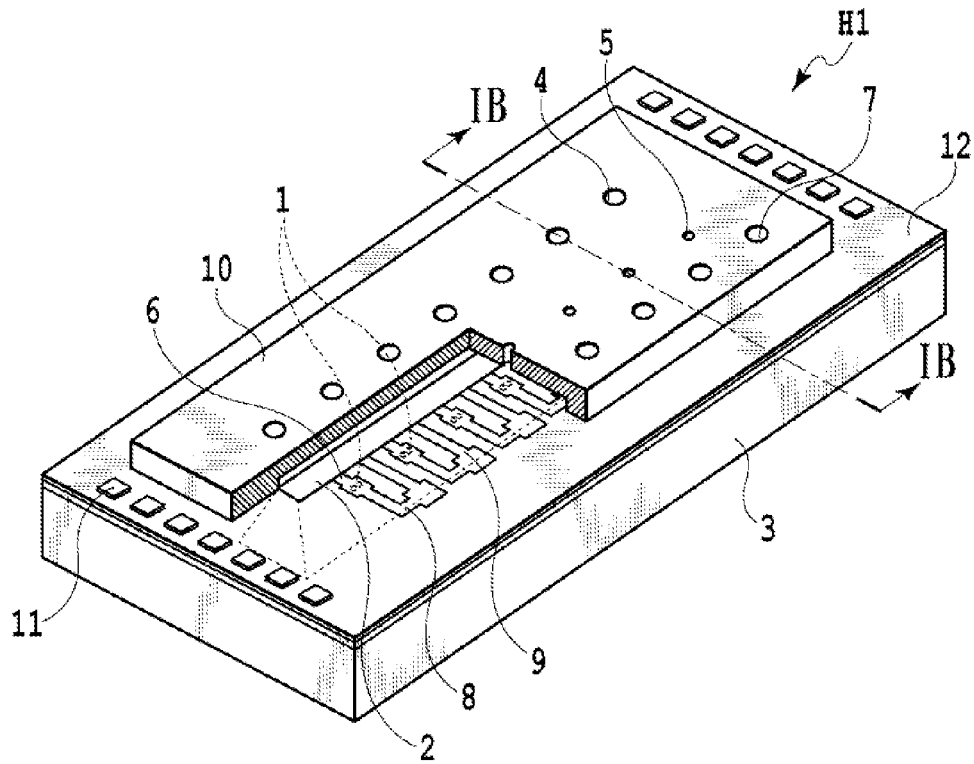
FIG. 1A is a schematic perspective view showing a liquid ejection head in a first embodiment according to the present invention.
Figure 1B:
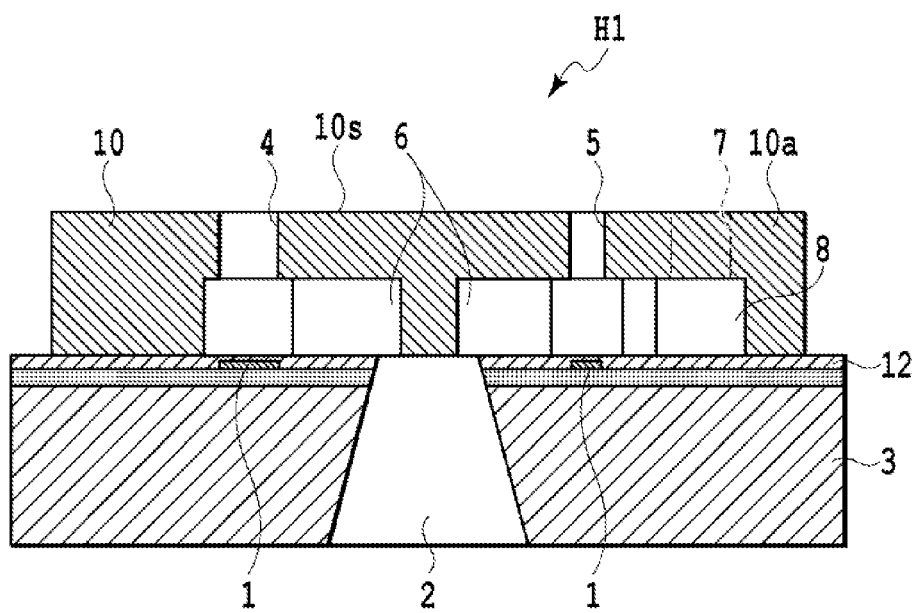
FIG. 1B is a cross-sectional view taken along a line IB-IB of FIG. 1A.
Figure 2A:
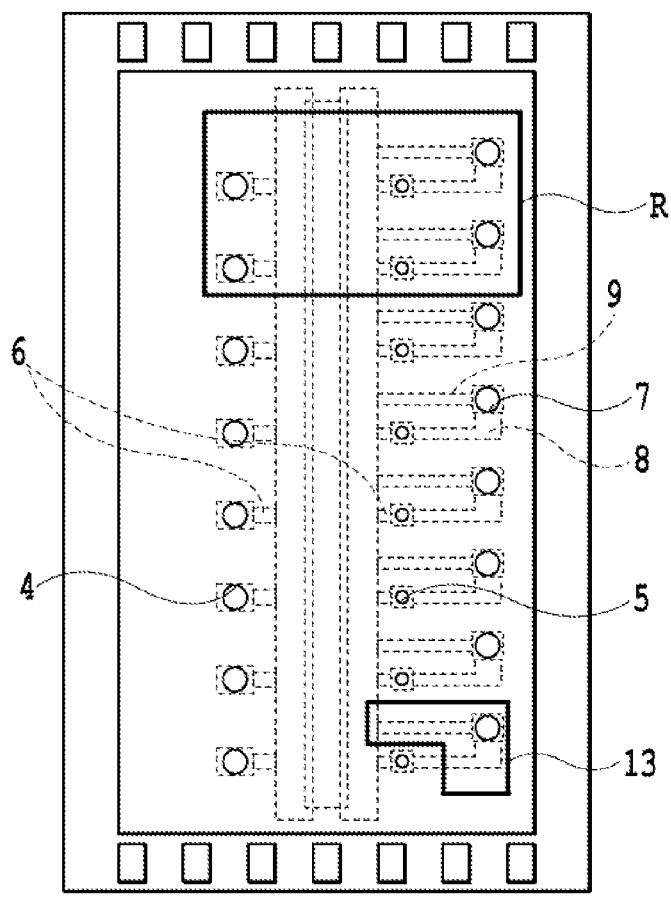
FIG. 2A is a plan view showing the liquid ejection head shown in FIGS. 1A and 1B.
Figure 2B:
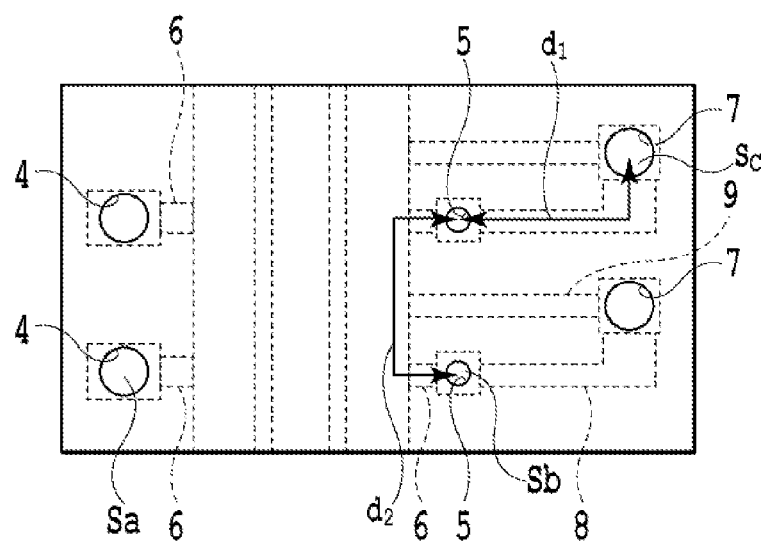
FIG. 2B is an enlarged view showing a box R of FIG. 2A.

A description will be given below of a liquid ejection head H1 in a first embodiment according to the present invention with reference to the attached drawings. Here, FIGS. 1A and 1B are views explanatory of the liquid ejection head H1 in the first embodiment, wherein FIG. 1A is a schematic perspective view showing the liquid ejection head H1 that is partly cut away and FIG. 1B is a cross-sectional view taken along a line IB-IB of FIG. 1A. FIG. 2A is a plan view showing the liquid ejection head H1 and FIG. 2B is an enlarged view showing a box R of FIG. 2A. FIGS. 3A to 3D and 4A to 4C are schematic cross-sectional views explanatory of each of processes in a fabrication method of the liquid ejection head H1.

As shown in FIG. 1A, the liquid ejection head in the present embodiment is provided with a substrate (i.e., an ejection element substrate) 3 and a member 10 laminated on either face (i.e., a surface) of the substrate 3. Energy generating elements 1 that generate energy for ejecting liquid to be ejected such as ink are formed at the substrate 3. Moreover, a liquid supply port 2, through which the liquid is supplied to an ink channel (i.e., a liquid channel) 6 defined by the substrate 3 and the member 10, is formed at the substrate 3. At the member 10, a plurality of kinds (two kinds herein) of ejection ports 4 and 5 having different opening areas are formed; the ink channel 6 communicating with each of the ejection ports 4 and 5; and further, a defoaming adjustor 13 including a defoaming opening 7, a defoaming channel 8, and an adjusting channel 9 is formed. In the present embodiment, in order to achieve both a high printing precision and a high printing speed, the large ejection ports 4, each having a predetermined opening area Sa (see FIG. 2B), and the small ejection ports 5, each having a predetermined opening area Sb smaller than that of each of the large ejection ports 4 (see FIG. 2B) are arranged substantially in parallel to each other in the longitudinal direction of the liquid ejection head H1. All of the large ejection ports 4 and the small ejection ports 5 communicate with the common liquid supply port 2 through the ink channels 6. Here, the member 10 may be formed of a single layer or a plurality of layers.

The substrate 3 serving as the ejection element substrate may be made of, for example, a silicon substrate, more specifically, a silicon single crystal substrate having the crystal plane orientation (100). On the substrate 3, the energy generating element 1 is formed at a position facing each of the ejection ports 4 and 5. The energy generating element 1 only can generate energy for ejecting ink from the ejection ports 4 and 5, and preferably, should generate energy capable of ejecting ink in the form of a fine droplet of, for example, 1 pL. Examples of the energy generating element 1 capable of ejecting a fine droplet include a heat generating resistor element (i.e., a heater) for boiling ink with heat, a piezoelectric element for applying a pressure to ink with a change in volume, and the like. More specifically, a heat generating resistor element serving as the energy generating element 1 may be formed of a wire made of Al or the like, a high resistant material typified by TaSiN or TaN, and the like.

The number and arrangement of energy generating elements 1 may be appropriately determined according to the structure of the liquid ejection head to be fabricated (e.g., the size or number of ejection ports). In the present embodiment, a plurality of energy generating elements 1 are arranged in two rows at a predetermined pitch in a manner corresponding to the plurality of ejection ports. Here, the size of the energy generating element 1, that is, energy generating ability that the energy generating element 1 can generate energy may be determined according to the opening area of the ejection port corresponding to the energy generating element 1. In other words, the energy generating ability of the energy generating element 1 corresponding to the large ejection port is set in such a manner as to eject a relatively large droplet: in contrast, the energy generating ability of the energy generating element 1 corresponding to the small ejection port is set to be lower than that of the energy generating element corresponding to the large ejection port.

As shown in FIG. 1A, electrode pads 11 and wires, not shown, for connecting the energy generating elements 1 and the electrode pads 11 to each other are formed on the substrate 3 by, for example, photolithography. The materials of the electrode pad 11 and the wire may be selected from metals such as aluminum, copper, nickel, gold, titanium, tungsten, palladium, iron, and chromium. One of these metals may be used singly or some of them may be used in combination (e.g., in a form of an alloy containing a plurality of metals).

Furthermore, a sacrifice layer, not shown, may be formed on the substrate 3 (i.e., a substrate obverse) by, for example, photolithography in order to define the opening width of the liquid supply port 2 on the side of the substrate obverse. Here, the substrate obverse signifies one surface, at which the member is formed, out of two opposite surfaces of the substrate whereas a substrate reverse signifies the other surface opposite to the substrate obverse. A layer that can be etched with an alkaline solution may be used as the sacrifice layer, and further, may be made of polysilicon, aluminum, aluminum silicon, aluminum copper, aluminum silicon copper, or the like.

Additionally, as shown in FIG. 1A, it is preferable that the substrate 3, the sacrifice layer, and the energy generating element 1 should be covered with a protecting film 12 made of SiO, SiN, Ta, or the like in order to suppress corrosion of the energy generating element 1 due to liquid and electrically insulate the energy generating element 1. In this case, the protecting film 12 may be formed over the entire substrate obverse so as to cover the wires, not shown, for connecting the energy generating elements 1 to the electrode pads 11, respectively. In addition, the protecting film 12 fulfills the function as an etching stopping layer when the liquid supply port 2 is formed.

In the liquid ejection head H1 in the present embodiment, a liquid tank, not shown, having an ink container, not shown, is disposed on the reverse (i.e., the side of the substrate reverse) of the liquid ejection head H1 shown in FIGS. 1A, 1B, 2A, and 2B, and thus, liquid is supplied to the liquid supply port 2 through a liquid supply path, not shown. The liquid supplied to the liquid supply port 2 is supplied to the liquid channel 6 communicating with the liquid supply port 2, and thus, the liquid channel 6 is filled with the liquid in such a manner as to cover the energy generating element 1. The energy generating element 1 is energized (i.e., driven) to apply energy (e.g., pressure) to the liquid in the state in which the liquid channel 6 is filled with the liquid, so that the droplets are ejected from the large ejection port 4 and the small ejection port 5 that communicate with the liquid channel 6. The droplets ejected from the large ejection port 4 and the small ejection port 5 are landed on a print medium, and thus, an image is printed.

As shown in FIG. 1B, the liquid supply port 2 normally takes the form of a through hole penetrating in a direction perpendicular to the plane of the substrate 3 and having openings at both the obverse and reverse of the substrate 3. As shown in FIGS. 1A and 1B, the liquid supply port 2 is formed between the two rows of the energy generating elements 1 in the present embodiment. Both of the obverse and reverse of the substrate 3 may be covered with a thermal oxidation film (i.e., a silicon oxidation film). A membrane may be formed by partly removing the thermal oxidation film formed on the substrate obverse.

In the meantime, the large ejection port 4 and the small ejection port 5 are formed inside of the member 10, to eject the liquid such as ink, as shown in FIG. 1B. The substrate 3 and the member 10 welded onto the substrate define the liquid channels 6 for allowing the liquid supply port 2 to communicate with the large ejection port 4 and the small ejection port 5.

The liquid ejection head in the present embodiment has the defoaming adjustor 13 that is a characteristic constituent. The defoaming adjustor 13 includes the defoaming opening 7 penetrating the member 10, the defoaming channel 8 for allowing the defoaming opening 7 to communicate with the small ejection port 5, and the adjusting channel 9 for allowing the liquid supply port 2 to communicate with the defoaming opening 7. Like the liquid channel 6, the defoaming channel 8 and the adjusting channel 9 are defined between the member 10 and the substrate 3 having the protecting film 12. From the viewpoint of a liquid flow when the liquid is sucked, the defoaming opening 7 is located downstream of the small ejection port 5. In other words, the liquid supply port 2, the small ejection port 5, the defoaming channel 8, and the defoaming opening 7 are arranged in this order from the upstream side. Here, the liquid supply port 2 is located upstream of the large ejection port 4.

The dimension and shape of the adjusting channel are determined such that the quantities of liquid and bubbles discharged from the large ejection port 4 and the defoaming opening 7, respectively, become equal to each other in the state in which a suction recovery mechanism 20, described later and shown in FIG. 5, applies a suction negative pressure to the liquid ejection head. In the present embodiment, the adjusting channel 9 is formed such that the combined resistance (on the assumption of one channel, the resistance of the channel) Rc of channel resistances of two channels from the liquid supply port 2 to the defoaming opening 7 becomes equal to a channel resistance Ra of the channel from the liquid supply port 2 to the large ejection port 4. Here, the combined resistance Rc is obtained by combining a channel resistance R1 of the channel from the liquid supply port 2 to the defoaming opening 7 through the liquid channel 6 and the defoaming channel 8 for the small ejection port 5 with a channel resistance R2 of the channel from the liquid supply port 2 to the defoaming opening 7 through the adjusting channel 9.

A channel resistance R is generally expressed by the following equation:

$$R = \int \alpha \times (1/S^2) \cdot dL \qquad \text{(Formula 1)}$$

wherein $\alpha$ represents a resistance coefficient; S, a channel cross-sectional area; and L, a channel length.

As is obvious from Formula 1, the greater the channel resistance R, the greater the channel length. In view of this, the defoaming channel 8 is formed such that a length d1 of a channel from the small ejection port 5 to the defoaming opening 7 is greater than a length d2 of a channel between the adjacent small ejection ports, as shown in FIG. 2B, so as to prevent a liquid drip from being generated by an influence of the liquid ejection from the small ejection port 5 on the defoaming opening 7. In general, the length d2 of the channel between the adjacent small ejection ports is set such that an influence of liquid ejection from one of the adjacent small ejection ports 5 cannot be exerted on the other small ejection port 5. Thus, when the above-described channel length d1 is longer than the channel length d2, it is possible to alleviate the influence of the ejection from the small ejection port 5 on the defoaming opening 7. Moreover, the small ejection port 5 and the defoaming opening 7 communicate with each other via the non-linear defoaming channel 8 in the present embodiment, thus further alleviating the influence of the ink ejection.

The opening area Sc of the defoaming opening 7 may be equal to or different from the opening area Sa of the large ejection port 4. However, the lower limit of the opening area Sc is defined from the viewpoint of the suppression of the suction negative pressure, and further, the upper limit of the opening area Sc is defined from the viewpoint of the suction performance of the large ejection port 4. Consequently, it is preferable to determine the opening area Sc of the defoaming opening 7 with respect to the opening area Sa of the large ejection port 4 within a range of ±10% of the opening area Sa of the large ejection port 4. Specifically, the relationship between the opening area Sc of the defoaming opening and the opening area Sa of the large ejection port 4 should be preferably determined, as follows:

$$0.9 \times Sa \leq Sc \leq 1.1 \times Sa \qquad \text{(Formula 2)}$$

Here, the area Sa should be 50 $\mu m^2$ or more and 1000 $\mu m^2$ or less. Meanwhile, the area Sc should be 45 $\mu m^2$ or more and 1100 $\mu m2$ or less.

Incidentally, a member (i.e., an ejection port forming member) for forming the ejection ports 4 and 5, the ink channel 6, and the defoaming adjustor 13 may include a plurality of members (e.g., a resin layer and a contact layer). In other words, the ejection port forming member may fulfill the function as a nozzle wall, an ink channel wall, and a defoaming adjustor wall, and therefore, may be constituted of this member and a layer (e.g., a contact layer).

Figure 5:
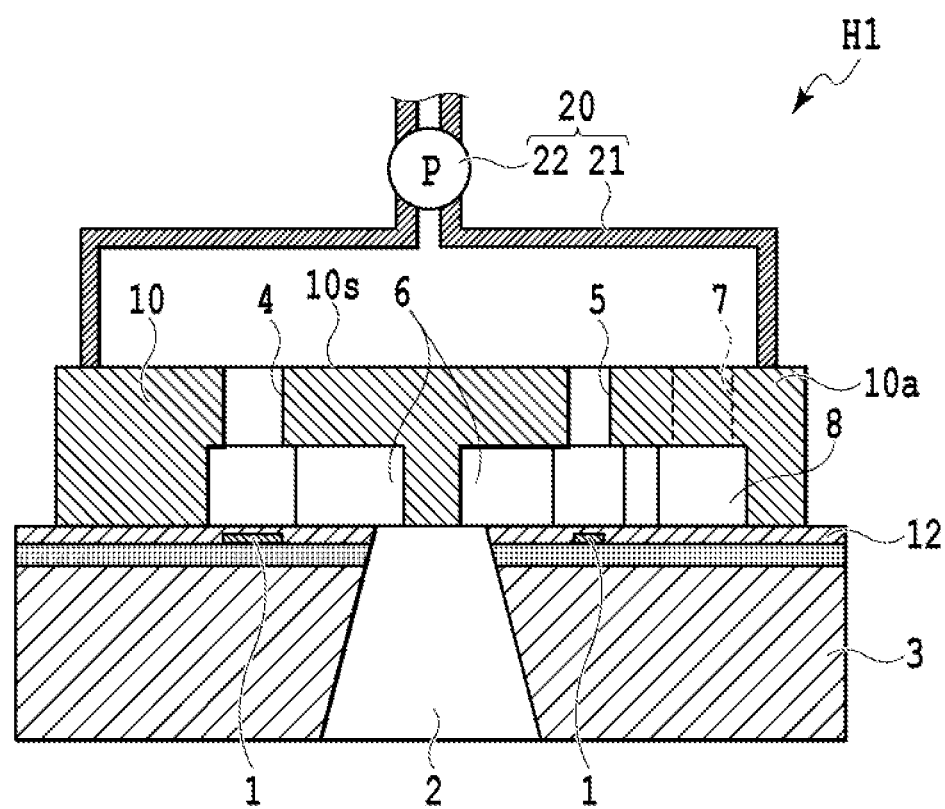
FIG. 5 is a schematic cross-sectional view showing a suction recovery mechanism with respect to the liquid ejection head shown in FIGS. 1A and 1B.

Suction recovery that replaces the liquid staying inside of the liquid ejection head H1 such configured as described above with ink that has no bubbles mixed therein and is suitably ejected is performed by the suction recovery mechanism 20, as shown in FIG. 5. The suction recovery mechanism 20 is provided with a cap 21 that can be brought into contact with an ejection port surface 10s having the ejection ports 4 and 5 and the defoaming opening 7 formed thereat and a pump 22 communicating with the cap 21. In the case where the suction recovery is performed, the cap 21 is brought into contact with the ejection port surface 10s, thereby applying a negative pressure to the ejection port surface 10s with the suction force of the pump 22. In this manner, the liquid staying inside of the liquid ejection head H1 and the bubbles mixed in the liquid are sucked to the cap through the ejection ports 4 and 5 and the defoaming opening 7, and then, are discharged. According to the sucking and discharging operations, the liquid staying in the liquid tank is supplied into the liquid ejection head H1 through the liquid supply port 2, and thus, the liquid ejection head H1 is filled with the liquid that is suitably ejected. At this time, in the present embodiment, the liquid and the bubbles are discharged from the large ejection port 4 and the defoaming opening 7 with the application of a minimum required suction negative pressure by the pump 22. Consequently, the bubbles taken into the liquid channel 6 for allowing the liquid supply port 2 and the small ejection port 5 to communicate with each other can be removed. Here, when the liquid and the bubbles are discharged from the large ejection port 4 and the defoaming opening 7, the liquid and the bubbles are discharged from the small ejection port 5 too, so that the liquid staying inside of the small ejection port 5 also is replaced with fresh liquid that is suitably ejected.

As described above, the present embodiment is configured such that the defoaming opening 7 having the same opening area as that of the large ejection port 4 is formed at the liquid ejection head having nozzles having different opening areas, and further, that the defoaming opening 7 is allowed to communicate with the small ejection port 5 and the liquid supply port 2. Therefore, liquid having an increased viscosity or bubbles can be discharged without applying an excessive suction negative pressure to the large ejection port 4. Consequently, it is possible to suppress the capture of bubbles from the liquid tank to the liquid ejection head. Moreover, the liquid ejection head can be subjected to a recovery operation under a predetermined suction negative pressure, so that the control of the suction recovery mechanism 20 can be simplified, and further, a time required for the recovery operation can be shortened, thus reducing the cost of the apparatus.

Figure 7A:
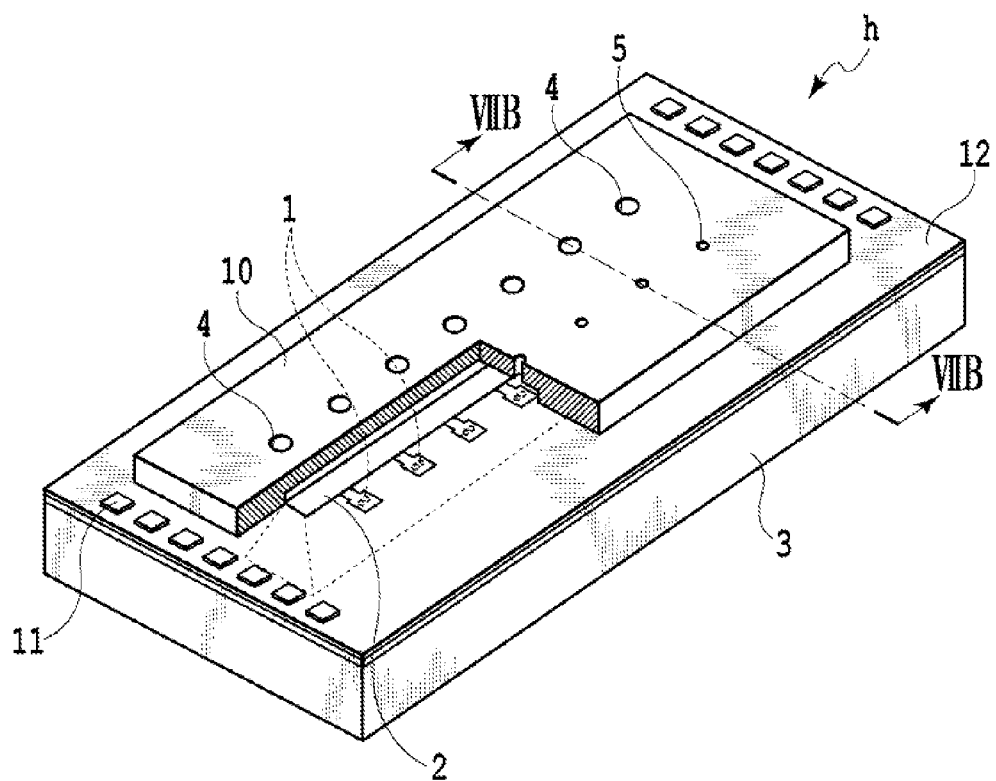
FIG. 7A is a schematic perspective view showing a liquid ejection head in the related art.
Figure 7B:
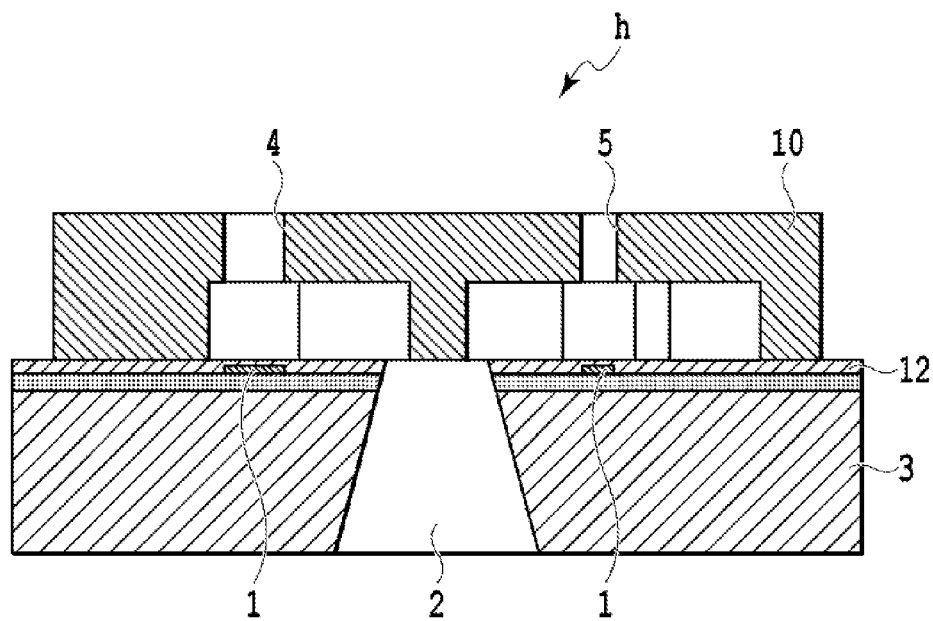
FIG. 7B is a cross-sectional view taken along a line VIIB-VIIB of FIG. 7A.

In contrast, no defoaming opening is formed in a conventional liquid ejection head, unlike the present embodiment, but only large ejection ports 4 and small ejection ports 5 are formed, as shown in FIGS. 7A and 7B. In FIGS. 7A and 7B, the same component parts as those in the present embodiment are designated by the same reference numerals. In a conventional liquid ejection head h shown in FIGS. 7A and 7B, when a cap 21 (see FIG. 5) performs a suction operation so as to satisfactorily perform a suction recovery process at the small ejection ports 5, an excessive negative pressure is applied to the large ejection ports 4. As a result, a flow rate of liquid surpasses the liquid supply ability on a liquid channel for the large ejection port, and therefore, bubbles are possibly captured into an ink channel from an absorber at a liquid tank. In contrast, the present embodiment can solve the problem experienced by the conventional liquid ejection head.

Examples of the liquid for use in the liquid ejection head include liquid that enhances fixability owing to coagulation or insolubility of a colorant contained in ink, a print quality and colorability, and image durability in addition to ink as liquid containing a colorant for forming an image on a print medium.

(Fabricating Method for Liquid Ejection Head)

Next, explanation will be made on one embodiment of a fabricating method for the liquid ejection head according to the present invention. A fabricating method for the liquid ejection head in the present embodiment includes the following steps:

(1) fabricating a mold for use in forming a die for molding a liquid channel, a defoaming channel, and an adjusting channel on a substrate having an energy generating element;

(2) forming a member for an ejection port wall, a liquid channel wall, a defoaming opening wall, a defoaming channel wall, and an adjusting channel wall;

(3) forming an ejection port and a defoaming opening on the members; and (4) removing the mold to mold the liquid channel, the defoaming channel, and the adjusting channel.

The fabricating method may include the step of:

(5) forming a liquid supply port penetrating the substrate having the energy generating element.

Each of the steps will be described below with reference to the attached drawings.

(First Step)

Figure 3A:
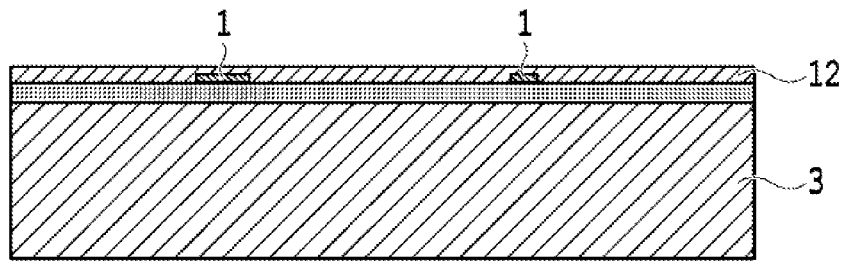
FIGS. 3A to 3D are schematic cross-sectional views showing basic fabrication processes for the liquid ejection head shown in FIGS. 1A and 1B.

First, the substrate 3 is prepared (FIG. 3A). The substrate 3 may have the energy generating elements 1 thereon, and further, may have the sacrifice layer, not shown, the protecting film 12, and the thermal oxidation film, not shown, as required. A resin layer 14a (FIG. 3B) that becomes a mold 14, described later, is formed on the substrate 3 (i.e., on the protecting film 12 in FIGS. 3A to 3D). The resin layer 14a may include, for example, a positive type resist. Examples of the positive type resist forming the resin layer 14a include an acrylic resin, or polymethylmethacrylate (PMMA), polymethylisopropenylketone (PMIPK), and the like. The thickness of the resin layer 14a, that is, the mold 14 may be appropriately set according to the thickness of the ink channel to be fabricated, and should generally be 10 μm or more and 20 μm or less.

Figure 3B:
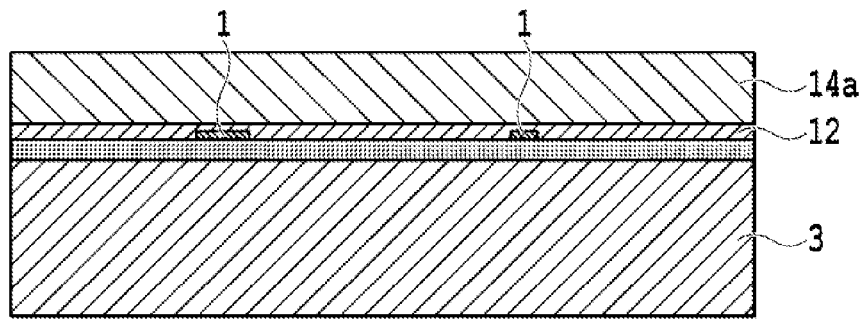
Figure 3C:
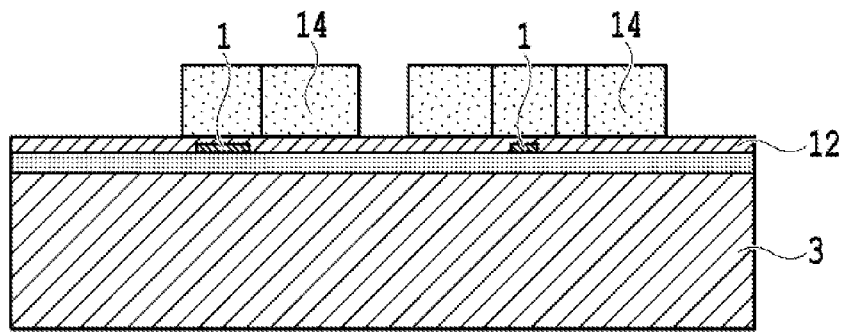

Next, a portion of the resin layer 14a other than the mold 14 is exposed to light and developed, and then, the resin layer 14a is patterned into patterns (i.e., the molds 14) serving as the liquid (ink) channel and the defoaming channel (FIG. 3C).

(Second Step)

Figure 3D:
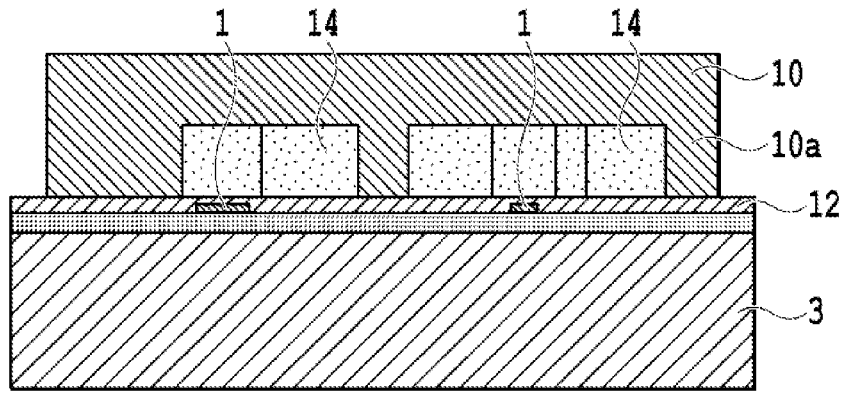

Subsequently, a resin layer 10a serving as the member 10 is formed (FIG. 3D). Here, in the first embodiment shown in FIGS. 1A and 1B, the resin layer 10a covers the protecting film 12 and the mold 14 which are exposed to the atmosphere. Examples of a material forming the resin layer 10a (i.e., the member 10) include a cationic polymerizable compound having a reactive functional group such as an epoxy group, an oxetane group, a vinyl ether group, and a propenylether group. However, a high mechanical strength and a tight contact with an undercoat are needed, and therefore, an epoxy compound having these characteristics is preferred. Examples of the epoxy resin include a bisphenol A type epoxy resin and a novolak type epoxy resin. Out of commercially available products, SU8 (trade name) manufactured by Nippon Kayaku Co., Ltd. and EHPE-3150 (trade name) manufactured by Daisel Corporation may be used. The thickness of the resin layer 10a, that is, the thickness of the member 10 should be preferably 20 μm or more from the viewpoint of a coating performance and 100 μm or less from the viewpoint of the curvature of the substrate 3 caused by a resin stress.

(Third Step)

Figure 4A:
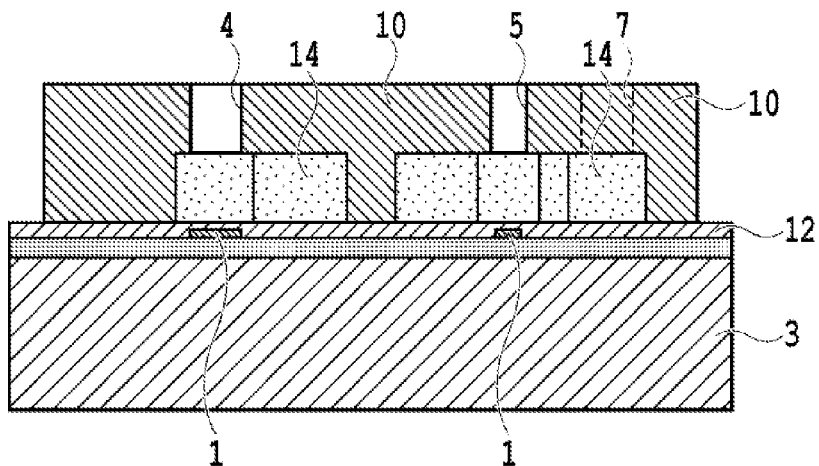
FIGS. 4A to 4C are schematic cross-sectional views showing basic fabrication processes for the liquid ejection head shown in FIGS. 1A and 1B.

Subsequently, the resin layer 10a is exposed to an ultraviolet ray, a Deep UV ray, or the like, followed by curing, so that the large ejection ports 4, the small ejection ports 5, and the defoaming openings 7 are formed at the resin layer 10a so as to obtain the member 10 having the mold 14 therein (FIG. 4A).

(Fourth Step)

Figure 4B:
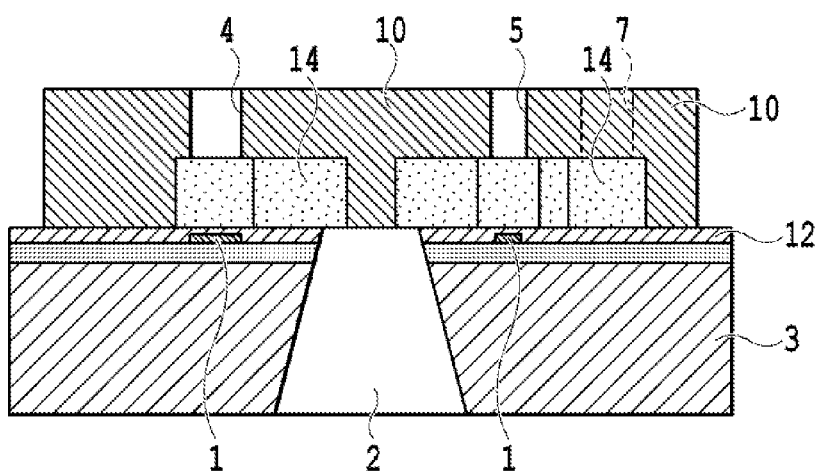

Subsequently, the liquid supply port 2 penetrating the substrate 3 having the energy generating elements 1 formed thereon is formed by anisotropic etching using TMAH-25 (trade name) manufactured by Kanto Chemical Co., Inc., thus obtaining an energy generating element substrate (FIG. 4B).

(Fifth Step)

Figure 4C:
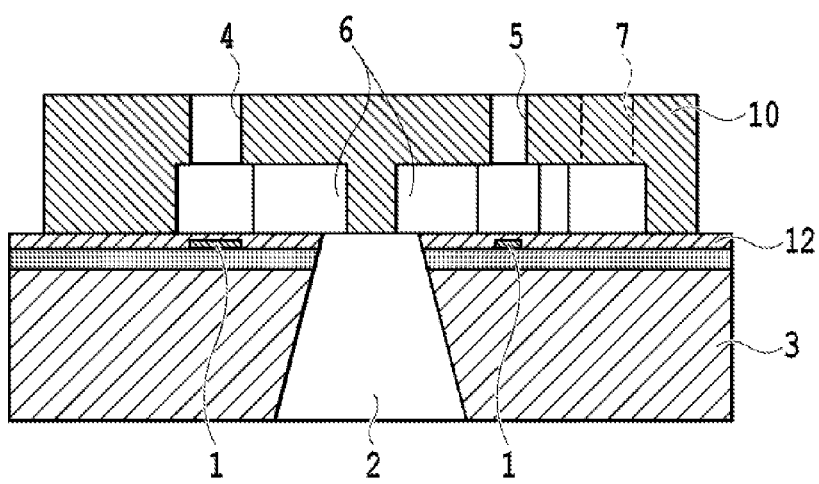

Next, the mold for the ink channel is removed by using, for example, Laclean MC (trade name) manufactured by Hayashi Pure Chemical Ind., Ltd., thus obtaining the liquid channel 6, the defoaming channel 8, and the adjusting channel 9, so as to complete an ejection port unit (FIG. 4C).

Furthermore, the substrate having the ejection port unit formed thereat is separately cut into chips by a dicing saw or the like, followed by electric welding for driving the energy generating element 1. Moreover, a chip tank member for supplying the liquid is connected to the substrate, thus obtaining the liquid ejection head H1 in the present embodiment.

Second Embodiment

Figure 6:
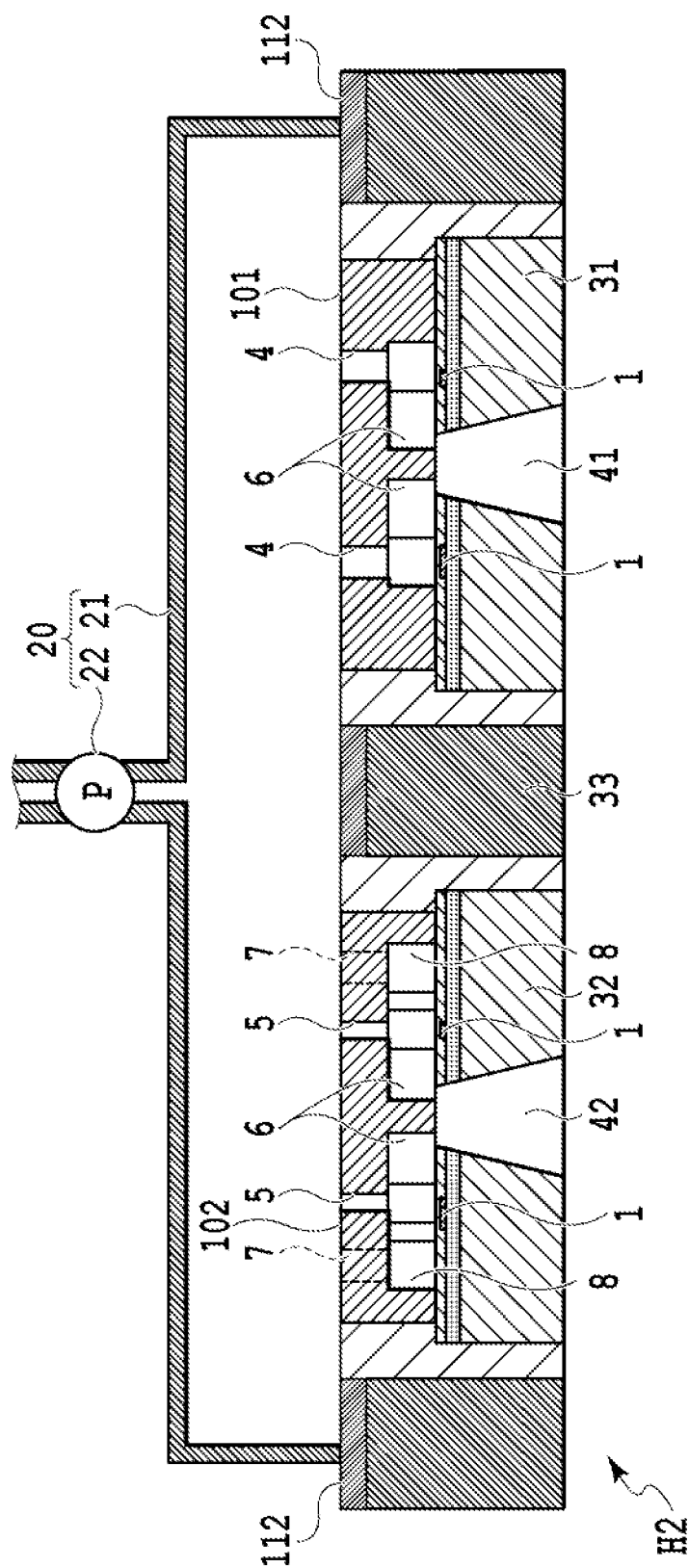
FIG. 6 is a schematic cross-sectional view showing a liquid ejection head and a suction recovery mechanism in a second embodiment according to the present invention.

Next, a second embodiment according to the present invention will be explained with reference to FIG. 6.

The liquid ejection head H1 in the first embodiment is such configured as to form the large ejection ports 4, the small ejection ports 5, the defoaming channel 8, and the adjusting channel 9 on one and the same substrate 3. On the other hand, a liquid ejection head H2 in the second embodiment is configured such that a substrate 31 having large ejection ports 4 formed thereat with a member 101 and a substrate 32 having small ejection ports 5 formed thereat with a member 102 are connected to each other via a connecting member 33. Here, a liquid supply port 41 is formed in the substrate 31, and further, a liquid channel, not shown, for allowing the large ejection port 4 and the liquid supply port 41 to communicate with each other also is formed at the substrate 31. In the meantime, a liquid channel 6 for allowing a liquid supply port 42 and the small ejection port 5 to communicate with each other, a defoaming channel 8 for allowing the small ejection port 5 and the defoaming opening 7 to communicate with each other, and an adjusting channel, not shown, for allowing the defoaming opening 7 and the liquid supply port 42 to communicate with each other, and the like are formed at the substrate 32.

Also in the liquid ejection head in the second embodiment in which the large ejection ports 4 and the small ejection ports 5 are formed on the different substrates, respectively, a suction recovery mechanism 20 can perform a suction recovery process, like in the first embodiment. Specifically, a cap 21 of the suction recovery mechanism 20 covers an ejection port surface 112, and further, a pump 22 reduces the pressure inside of the cap 21, so that liquid and bubbles can be discharged from the large ejection ports 4, the defoaming opening 7 having the same opening area as that of the large ejection port 4, and the small ejection ports. In the suction recovery process, the liquid or the like is sucked from the defoaming opening having the same opening area as that of the large ejection port 4, and therefore, the suction recovery process can be performed without applying an excessive negative pressure to the large ejection ports 4. Consequently, liquid having an increased viscosity or bubbles can be discharged, thus suppressing the capture of the bubbles from the liquid tank into the liquid ejection head.

Incidentally, although the first and second embodiments have been explained by way of the formation of the two kinds of large and small ejection ports having the different opening areas, the present invention is applicable to liquid ejection heads having three kinds or more of ejection ports having different opening areas. For example, the present invention is applicable to a liquid ejection head provided with three kinds of large, middle, and small ejection ports. In this case, a defoaming opening 7 and the liquid channel are formed such that a negative pressure required for a suction recovery process at the two ejection ports satisfies the relationship between the large ejection port and the small ejection port in the first embodiment. That is to say, the defoaming opening 7 only need be formed at a small ejection port or somewhere in such a manner as to appropriately perform suction recovery without applying an excessive negative pressure to any of ejection ports.

Although the adjusting channel 9 is formed from the liquid supply port 2 to the defoaming opening 7 in the first embodiment, the adjusting channel 9 may be omitted according to a combined channel resistance of the liquid channel 6 from the liquid supply port 2 and the small ejection port 5 and the defoaming channel 8 from the small ejection port 5 to the defoaming opening 7. In this case, the pattern material forming step and the pattern material removing step for forming the adjusting channel 9 can be omitted, thereby further simplifying the fabricating steps.

EXAMPLES

Next, the fabricating steps for the liquid ejection head in the first embodiment will be more specifically explained by way of the following examples.

First, as shown in FIG. 3A, the sacrifice layer made of Al was prepared on the silicon substrate 3 having the energy generating element 1 made of TaSiN by photolithography. Subsequently, the protecting film 12 made of SiN was formed in such a manner as to cover the substrate 3, the sacrifice layer, and the energy generating element 1.

Next, as shown in FIG. 3B, the resultant substrate (specifically, the surface of the protecting film 12) was coated with ODUR (trade name) manufactured by Tokyo Ohka Kogyo., Ltd. as the positive type resist in a thickness of 13 µm, followed by drying, thus forming the resin layer 14a.

Subsequently, as shown in FIG. 3C, the resign layer 14a was exposed to light by using an exposing device UX-3000 manufactured by Ushio Inc. and developed, followed by patterning, thus forming the mold 14 serving as a pattern for the ink channel, the defoaming channel, and the adjusting channel (First Step).

Next, as shown in FIG. 3D, the substrate having the mold 14 formed thereon (specifically, the protecting film 12 and the mold 14) were coated (covered) with a solution containing a photosensitive resin having a composition shown in Table 1 by spin-coating, thereby forming the resin layer 10 in a thickness of 25 µm (Second Step). Subsequently, as shown in FIG. 4A, the resin layer 10a was exposed to UV light and developed, thus forming the large ejection ports 4, the small ejection ports 5, and the defoaming openings 7 (Third Step). The opening area of the resultant large ejection port 4 was 200 µm$^2$. Moreover, the opening area of the small ejection port 5 was 50 µm$^2$. Additionally, the opening area of the defoaming opening 7 was 200 µm2.

TABLE 1

| | | |
|---|---|---|
| Epoxy resin | EHPE-3150 (trade name, manufactured by Daisel Corporation) | 100 parts by mass |
| Additive | 1,4-HFAB (manufactured by Central Glass Co., Ltd.) | 20 parts by mass |
| Photoacid generator | SP-172 (trade name, manufactured by ADEKA) | 6 parts by mass |
| Silane coupling agent | A-187 (trade name, manufactured by GE-Toshiba Silicone) | 5 parts by mass |
| Solvent | Xylene (manufactured by Kishida Chemical Co., Ltd.) | 70 parts by mass |

Next, as shown in FIG. 4B, the liquid supply port 2 penetrating the substrate 3 was formed with TMAH-25 manufactured by Kanto Chemical Co., Inc. (Fourth Step), and then, the mold 14 was removed with Laclean MC (trade name) MC manufactured by Hayashi Pure Chemical Ind., Ltd. In this manner, the large ejection ports 4, the small ejection ports 5, the defoaming openings 7, the ink channel 6, the defoaming channel 8, and the adjusting channel 9 were formed, leading to the completion of the ejection port unit on the liquid ejection substrate (Fifth Step). Furthermore, the liquid ejection substrate having the ejection port unit formed thereat was separately cut by a dicing saw into chips, followed by electric welding for driving the energy generating element 1. Subsequently, the chip tank member for supplying the ink was connected to the liquid ejection substrate, thus obtaining the liquid ejection head H1.

The liquid ejection head H1 was subjected to the suction recovery process. Thereafter, when the liquid channel was observed by an electronic microscope, the capture of bubbles from the liquid absorber in the liquid tank was not recognized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-211884, filed Oct. 9, 2013, which is hereby incorporated by reference herein in its entirety.

What is claimed is:

1. A liquid ejection head capable of ejecting liquid from a plurality of kinds of ejection ports having different opening areas, the liquid ejection head comprising:
    a liquid supply port communicating with the plurality of kinds of ejection ports; and
    a defoaming opening communicating, via a defoaming channel, with at least one kind of ejection port out of the plurality of kinds of ejection ports excluding the ejection port having the largest opening area out of the plurality of kinds of ejection ports,
    wherein the defoaming opening is located at a downstream side of the at least one kind of ejection port in a direction of liquid flow when the liquid in the liquid ejection head is sucked from the defoaming opening.

2. A liquid ejection head according to claim 1, wherein the plurality of kinds of ejection ports include a large ejection port having a large opening area and a small ejection port having an opening area smaller than that of the large ejection port, and the defoaming opening is located at a downstream side of the small ejection port in the liquid flow direction when the liquid in the liquid ejection head is sucked from the defoaming opening.

3. A liquid ejection head according to claim 1, further comprising:
    an adjusting channel for allowing the defoaming opening and the liquid supply port to communicate with each other.

4. A liquid ejection head according to claim 1, wherein a relationship between a length $d_1$ of the defoaming channel and a length $d_2$ of a channel between adjacent ejection ports out of the plurality of ejection ports communicating with the defoaming channel satisfies the inequality: $d_1 \geq d_2$.

5. A liquid ejection head according to claim 1, wherein the defoaming channel is of a nonlinear shape.

6. A liquid ejection head according to claim 1, wherein a channel resistance from the liquid supply port to the defoaming opening through one of the ejection ports and the defoaming channel communicating with the one ejection port is equal to a channel resistance from the liquid supply port to the ejection port having the largest opening area.

7. A liquid ejection head according to claim 1, wherein a combined resistance of channel resistance from the liquid supply port to the defoaming opening through one of the ejection ports and the defoaming channel communicating with the one ejection port and the channel resistance from the liquid supply port to the defoaming opening is equal to that from the liquid supply port to the ejection port having the largest opening area.

8. A liquid ejection head according to claim 1, wherein a relationship between the cross-sectional area $Sc$ of the defoaming opening and the largest cross-sectional area $Sa$ of one out of the plurality of kinds of ejection ports satisfies the inequality: $0.9 \times Sa \leq Sc \leq 1.1 \times Sa$.

9. A fabricating method for a liquid ejection head capable of ejecting liquid from a plurality of kinds of ejection ports having different opening areas, the fabricating method for a liquid ejection head comprising the steps of:
    forming a mold for molding a liquid channel for supplying liquid to at least one of the ejection ports and a defoaming channel communicating with the at least one ejection port on a substrate having an energy generating element for ejecting liquid from the ejection port and having a liquid supply port formed therein;
    forming a member covering the mold;
    forming the defoaming opening together with the ejection ports on the member; and
    removing the mold so as to form the liquid channel and the defoaming channel,
    wherein the defoaming opening is located at a downstream side of the at least one ejection port in a direction of liquid flow when the liquid in the liquid ejection head is sucked from the defoaming opening.

10. A fabricating method for a liquid ejection head according to claim 9, wherein the mold forming step comprises the step of forming a mold for molding an adjusting channel for allowing the liquid supply port and the defoaming opening to communicate with each other; and
    the mold removing step includes the step of removing the mold so as to form the adjusting channel.

* * * * *